US009391552B2

(12) United States Patent
Siddalingappa et al.

(10) Patent No.: US 9,391,552 B2
(45) Date of Patent: *Jul. 12, 2016

(54) CONTROL DEVICE AND METHOD FOR ESTABLISHING THE ROTOR ANGLE OF A SYNCHRONOUS MACHINE

(71) Applicant: Robert Bosch GmbH, Stuttgart (DE)

(72) Inventors: Arun Siddalingappa, Kornwestheim (DE); Sebastian Paulus, Esslingen Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

This patent is subject to a terminal disclaimer.

(21) Appl. No.: 14/018,590

(22) Filed: Sep. 5, 2013

(65) Prior Publication Data
US 2014/0070746 A1 Mar. 13, 2014

(30) Foreign Application Priority Data

Sep. 10, 2012 (DE) .......................... 10 2012 215 960

(51) Int. Cl.
| | |
|---|---|
| H02P 1/04 | (2006.01) |
| H02P 6/18 | (2016.01) |
| B60L 11/18 | (2006.01) |
| B60L 15/20 | (2006.01) |

(52) U.S. Cl.
CPC ............. *H02P 6/185* (2013.01); *B60L 11/1803* (2013.01); *B60L 15/20* (2013.01);
(Continued)

(58) Field of Classification Search
CPC ..... H02P 2021/0067; H02P 6/18; H02P 6/20; H02P 6/165; H02P 6/185
USPC ............. 318/400.33, 400.34, 400.02, 400.32, 318/400.35
See application file for complete search history.

(56) References Cited

U.S. PATENT DOCUMENTS

| | | | |
|---|---|---|---|
| 6,388,416 B1 * | 5/2002 | Nakatani et al. | ............... 318/700 |
| 2011/0037421 A1 * | 2/2011 | Kauppinen et al. | ...... 318/400.33 |

(Continued)

FOREIGN PATENT DOCUMENTS

| | | |
|---|---|---|
| DE | 102008042360 | 4/2010 |
| WO | 2009047217 | 4/2009 |

OTHER PUBLICATIONS

Schroedl, "Sensorless control of AC machines at low speed and standstill based on the 'INFORM' method," Industry Applications Conference, 1996. Thirty-First IAS Annual Meeting, IAS '96., Conference Record of the 1996 IEEE, Oct. 6-10, 1996, vol. 1, pp. 270-277.

(Continued)

*Primary Examiner* — Eduardo Colon Santana
*Assistant Examiner* — Bickey Dhakal
(74) *Attorney, Agent, or Firm* — Michael Best & Friedrich LLP

(57) ABSTRACT

A method for establishing the rotor angle of a synchronous machine. The method includes determining a first estimated value for the d-axis of the synchronous machine, feeding at least one refinement voltage pulse pair into the stator of the synchronous machine, the refinement voltage pulse pairs each distanced from the first estimated value for the d-axis of the synchronous machine by the same angular value in different directions, detecting the angle-dependent refinement current responses to the refinement voltage pulses, determining the angle-dependent refinement phase differences on the basis of the respective detected refinement current response, determining first estimated curves on the basis of at least some of the angle-dependent refinement current responses, determining second estimated curves on the basis of at least some of the angle-dependent refinement phase differences. and determining a refined estimated value for the d-axis of the synchronous machine on the basis of the estimated curves.

9 Claims, 6 Drawing Sheets

(52) U.S. Cl.
CPC ....... *B60L 2220/14* (2013.01); *B60L 2240/421* (2013.01); *B60L 2240/423* (2013.01); *H02P 2203/03* (2013.01); *H02P 2203/11* (2013.01); *Y02T 10/643* (2013.01); *Y02T 10/644* (2013.01); *Y02T 10/645* (2013.01); *Y02T 10/7005* (2013.01); *Y02T 10/72* (2013.01); *Y02T 10/7275* (2013.01)

(56) References Cited

U.S. PATENT DOCUMENTS

| | | | |
|---|---|---|---|
| 2013/0207588 A1* | 8/2013 | Lee et al. | 318/701 |
| 2014/0152202 A1* | 6/2014 | Tazawa et al. | 318/400.01 |

OTHER PUBLICATIONS

Ostlund et al., "Initial rotor position detections for an integrated PM synchronous motor drive," Industry Applications Conference, 1995. Thirtieth IAS Annual Meeting, IAS '95., Conference Record of the 1995 IEEE (vol. 1), Oct. 8-12, 1995, pp. 741-747.

Linke et al, "Sensorless speed and position control of synchronous machines using alternating carrier injection," Electric Machines and Drives Conference, 2003. IEMDC'03. IEEE International, Jun. 1-4, 2003, vol. 2, pp. 1211-1217.

Braun et al., "Sensorless rotor position estimation at standstill of high speed PMSM drive with LC inverter output filter," Industrial Technology (ICIT), 2010 IEEE International Conference on, Mar. 14-17, 2010, pp. 410-415.

* cited by examiner

CONTROL DEVICE AND METHOD FOR ESTABLISHING THE ROTOR ANGLE OF A SYNCHRONOUS MACHINE

BACKGROUND OF THE INVENTION

The invention relates to a control device and a method for establishing the rotor angle of a synchronous machine, in particular at standstill of a synchronous machine of an electric drive system of an electrically operated vehicle.

It is becoming apparent that, in the future, electronic systems that combine new energy storage technologies with electric drive technology will be used increasingly both in stationary applications, such as in wind turbines or solar installations, and in vehicles, such as hybrid or electric vehicles.

When regulating a synchronous machine, for example in an electric drive system of an electrically operated vehicle, the knowledge of the position of the rotor relative to the stator of the synchronous machine plays a central role. In order to provide a required torque with a synchronous machine, a rotating electric field is generated in the stator of the machine and rotates synchronously with the rotor. For the generation of this field, the current angle of the rotor is required for the regulation process.

One possibility for determining the rotor angle lies in the implementation of a sensor in the synchronous machine, said sensor being able to detect the rotor angle. Exemplary sensor types include incremental sensors, resolvers, Vogt sensors and digital Hall sensors.

A further possibility for determining the rotor angle lies in sensorless determination methods. For example, different methods for sensorless determination of a rotor angle of a synchronous machine are known from the documents by Schroedl, M.: "Sensorless control of AC machines at low speed and standstill based on the INFORM method", Industry Applications Conference, 1996, 31$^{st}$ IAS Annual Meeting; Ostlund, M., Brokemper, M.: "Initial rotor position detections for an integrated PM synchronous motor drive", Industry Applications Conference, 1995, 30$^{th}$ IAS Annual Meeting; Linke, M., Kennel, R., Holtz, J.: "Sensorless speed and position control of synchronous machines using alternating carrier injection", Electric Machines and Drives Conference, 2003, IEMDC'03; and Braun, M., Lehmann, O., Roth-Stielow, J.: "Sensorless rotor position estimation at standstill of high speed PMSM drive with LC inverter output filter", 2010 IEEE International Conference on Industrial Technology (ICIT).

Documents DE 10 2008 042 360 A1 and WO/2009/047217 A2 each disclose a method for determining the rotor angle of a synchronous machine at standstill with the aid of iterative test pulses.

SUMMARY OF THE INVENTION

The present invention, in accordance with one aspect, creates a method for establishing the rotor angle of a synchronous machine, said method comprising the steps of determining a first estimated value for the d-axis of the synchronous machine, of feeding at least one refinement voltage pulse pair each of predefinable pulse length and pulse height into the stator of the synchronous machine, wherein the refinement voltage pulse pairs are each distanced from the first estimated value for the d-axis of the synchronous machine by the same angular value in different directions, of detecting the angle-dependent refinement current responses to the refinement voltage pulses, of determining the angle-dependent refinement phase differences on the basis of the respective detected refinement current response, of determining first estimed curves on the basis of at least some of the angle-dependent refinement current responses, of determining second estimated curves on the basis of at least some of the angle-dependent refinement phase differences, and of determining a refined estimated value for the d-axis of the synchronous machine on the basis of the first and/or second estimated curves.

The present invention, in accordance with a further aspect, creates a control device for establishing the rotor angle of a synchronous machine, wherein the control device is designed to carry out a method in accordance with an aspect of the invention.

In accordance with a further aspect, the present invention creates an electric drive system having a control device according to the invention and a synchronous machine, wherein the control device is designed to control the synchronous machine in accordance with the established rotor angle.

One concept of the present invention is to implement a sensorless rotor angle determination for synchronous machines, in particular at standstill. Here, the determination method is based on the generation of test voltage pulses in predefinable sequence, these test voltage pulses being fed into the stator inductors of the synchronous machine. The rotor angle can then be determined based on the measured current responses. Here, the determination is carried out both for salient-pole machines and for non-salient-pole machines. Depending on the necessary or desired accuracy of the rotor angle determination, the procedure can be divided into two test portions, wherein, in the first portion, one or two voltage pulses is/are generated, such that, when comparing the current response and the phase difference of the phase current from the phase of the voltage, a rough estimation can be established for the d-axis. This rough estimation can then be used in a second portion in order to feed pairs of voltage pulses, which are grouped symmetrically about the estimated d-axis, into the synchronous machine and to specify the rough estimated value for the d-axis via an adjustment computation algorithm, for example a linear regression of the current responses or phase differences.

A significant advantage of this approach is that the number of necessary voltage pulses can be minimized depending on the necessary or desired accuracy. Alternatively, with constant pulse number, the accuracy of the angle determination can be increased compared to known methods. In addition, the robustness and reliability of the rotor angle determination is considerably better compared to known sensorless methods. This enables the use of the rotor angle determination for example in production vehicles with electric drive system.

In addition, the extent to which the rotor angle determination is dependent on the accuracy or quality of the current sensors used is reduced. More favorable current sensors can therefore be used, which lowers the manufacturing costs of the electric drive system. The rotor angle determination can also be carried out in a self-diagnosis operating mode without the need for external calibration.

Furthermore, there is the advantage that there is no build-up of significant torque over the course of the determination procedure, and therefore the position of the rotor of the synchronous machine is not changed, or is not significantly changed, by the applied voltage pulses. The development of noise and waste heat caused by the applied voltage pulses is thus reduced.

The risk of undesired torque formation at standstill of the synchronous machine is advantageously reduced, particularly in the case of salient-pole machines, since the saturation pulses can only be applied in the direction of the estimated d-axis.

In accordance with an embodiment of the method according to the invention, the method may also comprise the step of feeding a multiplicity of calibration voltage pulses of predefinable pulse length and pulse height into the stator of the synchronous machine, detecting the angle-dependent calibration current responses to the calibration voltage pulses, determining the angle-dependent calibration phase differences on the basis of the respective detected calibration current response, and determining the current response characteristic curve and the phase difference characteristic curve of the synchronous machine on the basis of the angle-dependent calibration current responses and calibration phase differences respectively. Characteristic curves can thus be readjusted continually during the operation of the electric drive system.

In accordance with a further embodiment of the method according to the invention, calibration voltage pulses can be fed into the stator of the synchronous machine in pairs offset in each case by 180° with respect to the stator angle. The risk of introducing undesired torques into the synchronous machine is thus reduced.

In accordance with a further embodiment of the method according to the invention, the determination of the initial estimated value for the rotor angle of the synchronous machine may comprise the formation of the mean value of the first and second estimated values involved in the smallest difference.

In accordance with a further embodiment of the method according to the invention, the synchronous machine may comprise a non-salient-pole machine, wherein at least two initial voltage pulses, which bring the non-salient-pole machine into saturation, are fed into the stator of the non-salient-pole machine.

BRIEF DESCRIPTION OF THE DRAWINGS

Further features and advantages of embodiments of the invention will emerge from the following description with reference to the accompanying drawings.

In the drawings.

DETAILED DESCRIPTION

Like reference signs generally denote similar or functionally like components. The schematic signal and parameter curves shown in the figures are merely exemplary and are illustrated in an idealized manner for reasons of clarity. It goes without saying that deviating signal and parameter curves can be produced in practice due to deviating boundary conditions, and that the illustrated signal and parameter curves serve merely to illustrate principles and functional aspects of the present invention.

Within the meaning of the present invention, synchronous machines are electric machines in which a constantly magnetized rotating part or rotor is driven synchronously by a time-dependent magnetic rotating field in the surrounding non-rotating part or stator by magnetic interaction, such that the rotor performs a movement synchronous to the voltage conditions in the stator, that is to say the rotational speed over the number of pairs of poles is dependent on the frequency of the stator voltage. Synchronous machines within the meaning of the present invention may be three-phase synchronous machines for example, which for example are formed as revolving-armature or stationary-armature machines that have a rotor and a stator. Furthermore, synchronous machines within the meaning of the present invention may comprise salient-pole machines or non-salient-pole machines. Non-salient-pole machines have an axis-independent inductance of the rotor, whereas salient-pole machines have a distinguished pole axis, also referred to as a d-axis, in the direction of which the magnetizing inductance is greater than in the direction of the pole gaps, also referred to as the q-axis, due to the smaller air gap. The methods and control devices mentioned hereinafter can, in principle, be used equally for non-salient-pole machines and salient-pole machines unless reference is made hereinafter explicitly to different handling of synchronous machine types.

Figure 1:
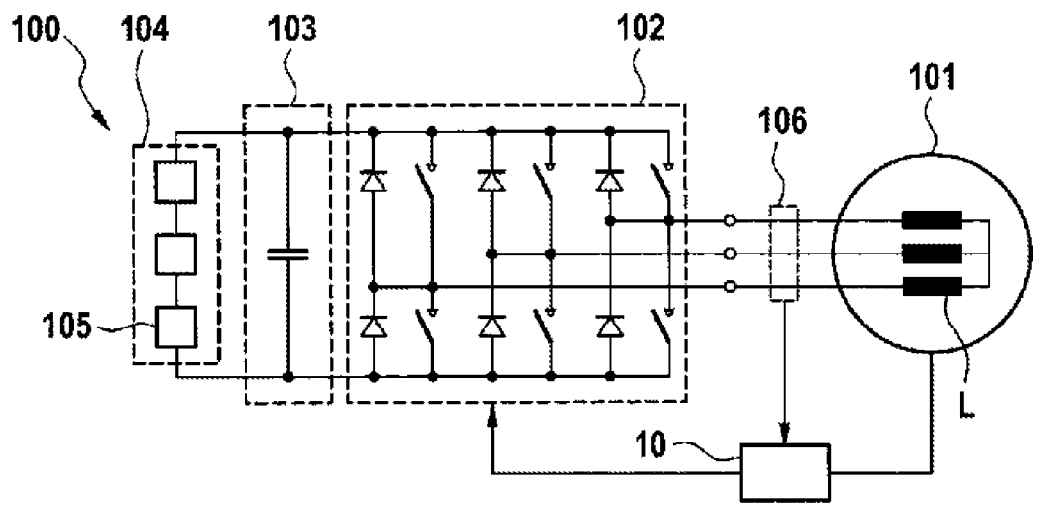
FIG. 1 shows a schematic illustration of an electric drive system with a synchronous machine according to an embodiment of the present invention.

FIG. 1 shows a schematic illustration of an electric drive system 100 with a synchronous machine 101, into which three-phase current can be fed. Here, a d.c. voltage provided by a d.c. link 103 is converted into a three-phase a.c. voltage via an inverter in the form of a pulse-width-modulation inverter 102. The d.c. link 103 is fed by a string 104 formed of battery modules 105 connected in series. In order to meet the requirements of power and energy defined for a respective application, a plurality of battery modules 105 are often connected in series in a traction battery 104.

The electric machine 101 may, for example, be a synchronous machine 101 which has stator inductors L. By way of example, the synchronous machine 101 is a three-phase synchronous machine. It is also possible in principle however to provide a different number of phases for the synchronous machine. Here, the regulation of the synchronous machine 101 in the electric drive system plays a central role. In order to provide a required torque with a synchronous machine, a rotating electric field is generated in the stator of the machine and rotates synchronously with the rotor. For the generation of this field, the current angle of the rotor is required for the regulation process.

The electric drive system 100 therefore comprises a control device 10, which is coupled to the synchronous machine 101 and is designed to control the synchronous machine 101 or to regulate the operation thereof. For this control or regulation, the control device 10 utilizes the time-dependent rotor angle of the rotor of the synchronous machine 101 with respect to the stator of the synchronous machine 101. Here, the control device 10 may detect electric operating parameters at the input connections of the synchronous machine 101 via an interface 106. For example, the control device 10 may be designed to establish the momentary phase currents and/or the momentary phase voltages at the inputs of the synchronous machine 101 via the interface 106. Current sensors such as shunt resistors, magnetoresistive resistors, sensor power semiconductors or Hall sensors, or voltage sensors can be used to detect the phase currents and phase voltages.

The way in which the control device 10 establishes the rotor angle of a synchronous machine 101, in particular at standstill of the synchronous machine 101, will be explained with reference to FIGS. 2 to 12 as well as the correlations that are to be taken into consideration during this process. Here, the control device 10 may in particular implement one or both of the methods 20 and 30 explained with reference to FIGS. 13 and 14 respectively.

Figure 2:
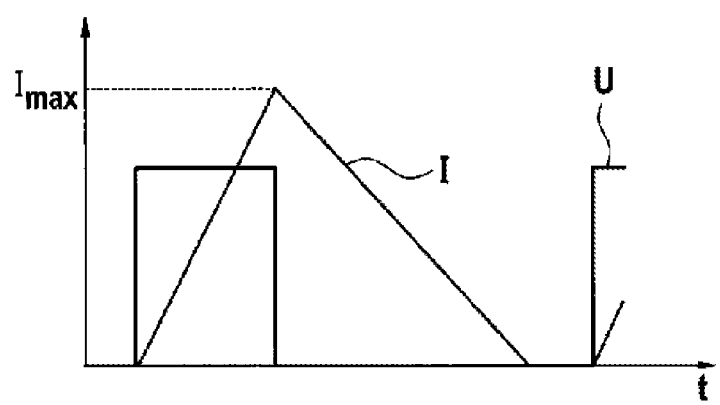
FIG. 2 shows a schematic illustration of voltage pulses and current responses thereof in a synchronous machine according to a further embodiment of the present invention.

FIG. 2 shows a schematic illustration of non-saturating voltage pulses U and the current responses I thereof in a salient-pole machine over time. The direct-axis components of current $I_d$ and quadrature-axis components of current $I_q$ of a permanently excited synchronous machine behave in a manner dependent on the rotor inductance $L_d$ in polar axis direction and on the rotor inductance $L_q$ in pole gap direction and on the applied voltage $U_d$ or $U_q$ respectively as follows:

$$dI_d/dt = L_d^{-1} \cdot U_d$$

$$dI_q/dt = L_q^{-1} \cdot U_q.$$

This is true for the standstill of the rotor of the synchronous machine and with constant rotor flux over time if it can also be assumed that the reactance of the rotor is only insignificantly dependent on the ohmic resistance. In addition, it is assumed that the pole shoe(s) is/are not operated in saturation, that is to say that the relationship between current and magnetic flux is linear and the respective inductance is not dependent on the current intensity.

With a voltage pulse of predefined length and predefined constant intensity, the current therefore rises linearly with the length of the voltage pulse up to a maximum value $I_{max}$. This maximum value $I_{max}$ is dependent here on the respective inductance $L_d$ or $L_q$.

Figure 3:
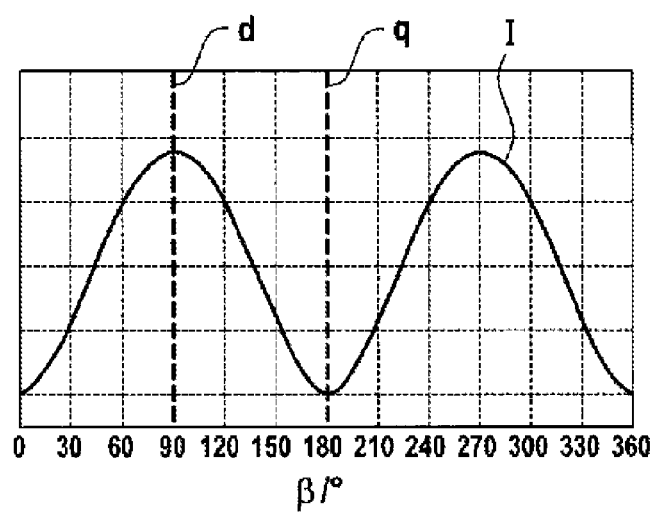
FIG. 3 shows a schematic current/time graph for the current response of a synchronous machine according to a further embodiment of the present invention.

FIG. 3 shows the dependence of the maximum current value $I_{max}$, that is to say the current response I to a voltage pulse, along the rotor angle β. The rotor angle β is the angle enclosed by the q-axis and the primary stator axis. In FIGS. 3 to 10, which each show parameter curves in accordance with the rotor angle β, the rotor angle β is illustrated here over a full rotor revolution in each case, that is to say 360°. The setting of the reference angle of 0° in the negative q-axis direction is merely exemplary in this case. It is therefore conceivable to also set the rotor angle β to other reference angles. For improved orientation, the angle 90° is given as the d-axis direction or polar axis direction, and the angle 180° is given as the q-axis direction or pole gap direction in each of FIGS. 3 to 10.

Figure 4:
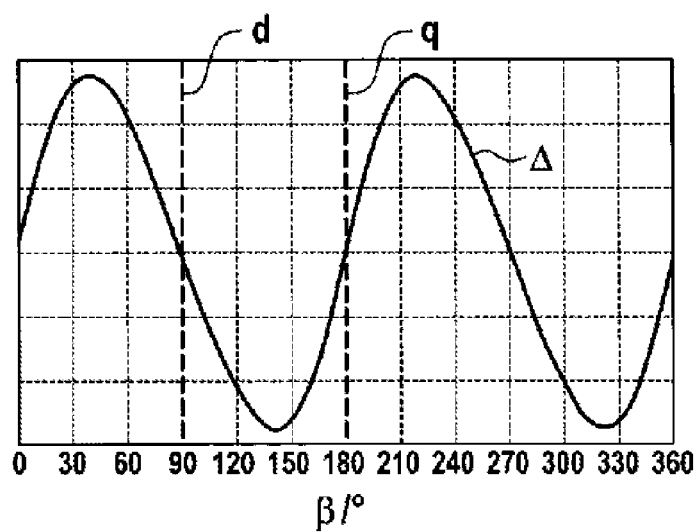
FIG. 4 shows a schematic phase difference graph for the phase difference between current and voltage of a synchronous machine according to a further embodiment of the present invention.

FIG. 4 shows the dependence of the phase difference Δ between the voltage pulse U and the current response I along the rotor angle β for a salient-pole machine. The current angle $β_I$ is defined here as $$β_I = \tan^{-1}(I_q/I_d).$$

The voltage angle $β_U$ is accordingly defined as $$β_U = \tan^{-1}(U_q/U_d).$$

Figure 5:
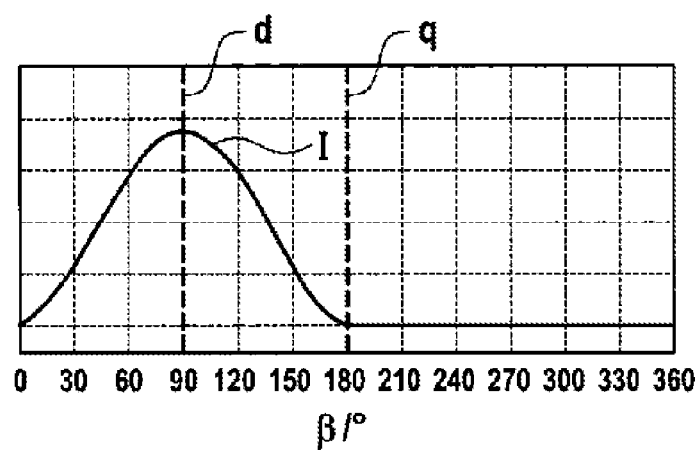
FIG. 5 shows a schematic current/time graph for the current response of a non-salient-pole machine according to a further embodiment of the present invention.
Figure 6:
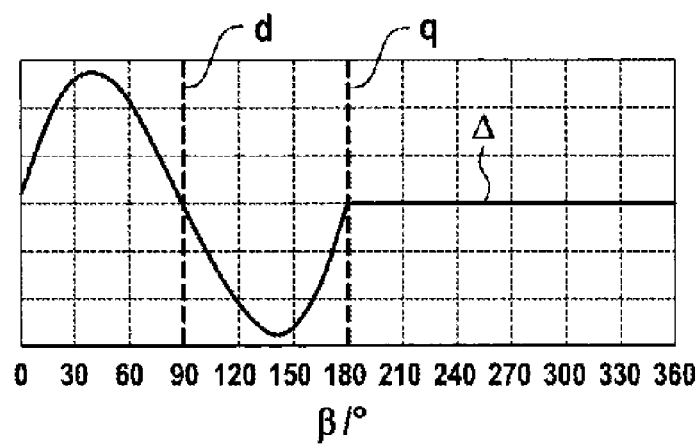
FIG. 6 shows a schematic phase difference graph for the phase difference between current and voltage of a non-salient-pole machine according to a further embodiment of the present invention.
Figure 7:
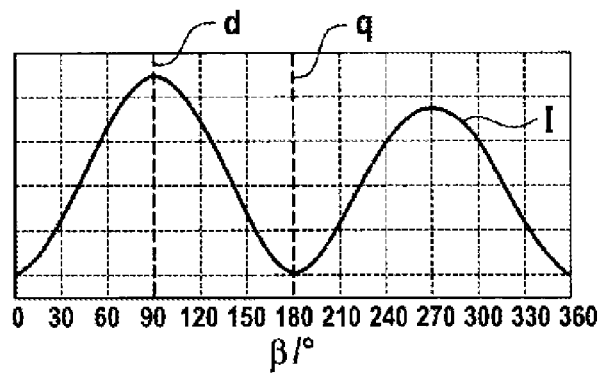
FIG. 7 shows a schematic current/time graph for the current response of a salient-pole machine according to a further embodiment of the present invention.
Figure 8:
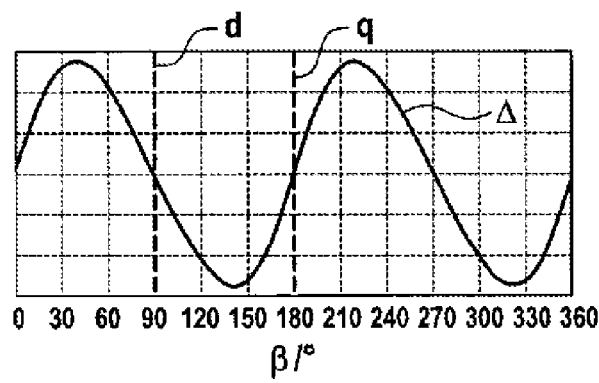
FIG. 8 shows a schematic phase difference graph for the phase difference between current and voltage of a salient-pole machine according to a further embodiment of the present invention.

In the case of a non-salient-pole machine, a behavior is given both for the current response I and for the phase difference Δ, said behavior demonstrating rotor-angle-dependent behavior only in saturation. A behavior of this type is shown by way of example in FIGS. 5 and 6 for the current response I and the phase difference Δ of a non-salient-pole machine. At high currents, the pole shoe of the non-salient-pole machine is saturated and the relationship between current and magnetic flux has non-linearities, that is to say the inductance depends on the current intensity and on the rotor angle. In a first approximation (with dependence purely on rotor angle and current intensity), the current response curve I illustrated in FIG. 5 is produced for the non-salient-pole machine in accordance with the rotor angle β. FIG. 6 shows the corresponding dependence of the phase difference Δ on the rotor angle β.

By contrast, in the case of a salient-pole machine, the angular dependence without saturation caused by the different polar axis and pole gap inductances $L_d$ and $L_q$ respectively is superimposed by the angular dependence with saturation. The curve illustrated in FIG. 7 for the current response curve I and the curve illustrated in FIG. 8 for the phase difference Δ are thus produced for the salient-pole machine in accordance with the rotor angle β.

In order to determine or estimate the rotor angle β of the rotor, one or more test voltage pulses of specific length and direction, that is to say angular dependence with respect to the stator coordinate system, is/are fed into the synchronous machine in various method portions and the respective current responses are established. The current response can be produced for example by measuring the maximum current $I_{max}$ or by integrating the current intensity over the length of the test voltage pulse. Once the current response has been determined, the synchronous machine can be switched into freewheeling operation via a corresponding control of the pulse-width-modulation inverter for a predefinable period of time between the voltage pulses in order to reduce more quickly the current impressed into the synchronous machine.

The phase difference for the respective test voltage pulse can then be established from the detected current response and the voltage pulses. The rotor angle β is then estimated by means of the two measured values for the current response I and the phase difference Δ with the aid of the characteristic curves illustrated in FIGS. 5 to 8 in accordance with the type of synchronous machine. Reference is made here by way of example in each of FIGS. 9 to 12 to a salient-pole machine, wherein the method for determining the rotor angle β in principle functions similarly for a non-salient-pole machine with adaptation of the appropriate characteristic curves.

Firstly, the characteristic curves can be calibrated at the start of the rotor angle determination. For example, by means of simulation with special models, it is possible to test, even before manufacture of the first prototype of a machine, whether the corresponding synchronous machine is suitable in principle for the rotor angle determination methods presented here. If this is the case, a calibration procedure can be carried out once or repeatedly, for example with each start of the electric drive system, in order to establish the characteristic curves of the respective synchronous machine for the current response I and the phase difference Δ.

To this end, a plurality of pairs of in each case two test voltage pulses of fixed amplitude can be applied to the synchronous machine, and the respective current response established. The pairs of test voltage pulses should each be applied offset by 180° in relation to one another in order to avoid an introduction of an undesired torque into the machine. In addition, the decay of the current in the synchronous machine can be accelerated by the offset by 180°. The number of pairs of test voltage pulses should be selected such that they are distributed uniformly over one electric revolution. When establishing the current response, the respective target voltage and the respective d.c. link voltage are stored. The detected current is then dependent on the stored voltages, the inductances $L_d$ and $L_q$ of the synchronous machine, and the current rotor angle to be determined.

If the inductances or the voltages are sufficiently well known or identifiable, a parameter identification of the corresponding voltages or inductances can additionally be carried out via the known properties.

Figure 9:
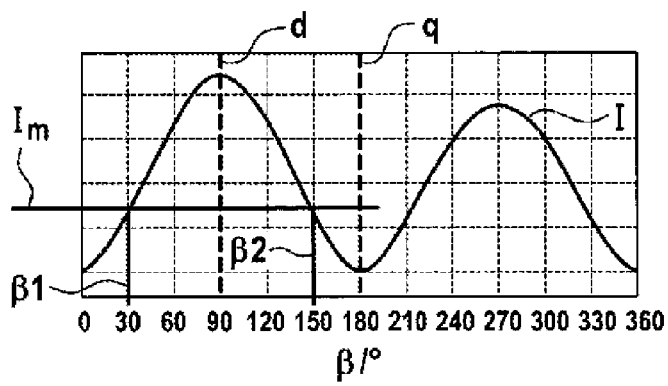
FIG. 9 shows a schematic current/time graph for the estimation of the d-axis of a rotor of a synchronous machine according to a further embodiment of the present invention.
Figure 10:
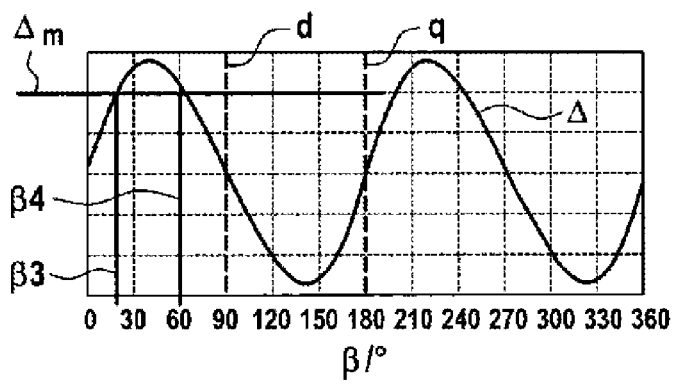
FIG. 10 shows a schematic phase difference graph for the estimation of the d-axis of a rotor of a synchronous machine according to a further embodiment of the present invention.

The characteristic curves established via the first calibration are then used to form the basis of the initial angle determination steps shown in FIGS. 9 and 10.

With reference to FIGS. 9 and 10, an initial voltage pulse can be applied to the synchronous machine in a first step in order to obtain a first estimation for the rotor angle β from the characteristic curves for the current response I and the phase difference Δ. To this end, in the case of salient-pole machines, a non-saturating initial voltage pulse can be selected so as not to generate any torque in the synchronous machine. By contrast, in the case of non-salient-pole machines, it is necessary to use saturation pulses in order to drive the machine in saturation, since otherwise no rotor-angle-dependent behavior of the synchronous machine can be provoked.

As is clear from FIG. 9, the initial voltage pulse leads to a measured current response Im. By comparison with the characteristic curve for the current response I, two first estimated values for the rotor angle β, specifically β1 and β2, are produced in the angular range between 0° and 180°. In the example illustrated in FIG. 9, these are approximately 30° and approximately 150°. As is clear from FIG. 10, the comparison of the established phase difference Δm with the characteristic curve for the phase difference Δ likewise leads to two second estimated values for the rotor angle β, specifically β3 and β4. In the present example, these are approximately 20° and approximately 60°.

Differences between each of the first estimated values and each of the second estimated values can then be formed for the rotor angle β—in the present example this corresponds to four differences (β1−β3, β4−β1, β3−β2 and β2−β4). In the case of the smallest difference, it can then be assumed that the respective first and second estimated values are the most accurate estimated values. An initial estimated value can therefore be formed as a mean value of the two most accurate estimated values.

For the salient-pole machine, the resolution of the rotor angle is only carried out between 0° and 180°, since the inductance change with non-saturating voltage pulses is produced from the viewpoint of the stator with double electric frequency. By contrast, in the case of a non-salient-pole machine, two initial voltage pulses are necessary in order to determine the initial estimated value for the rotor angle, since with saturation pulses there is a periodic behavior over 360° for the current response and the phase difference.

Once the initial voltage pulse or the initial voltage pulses has/have been applied, the initial estimated value can then be refined. This may then be desirable for example if an accurate rotor angle determination that is more robust than the initial estimation is necessary. The starting point for refining the initial estimated value is the determination of a first estimated value d1 for the d-axis on the basis of the initial estimated value.

Figure 11:
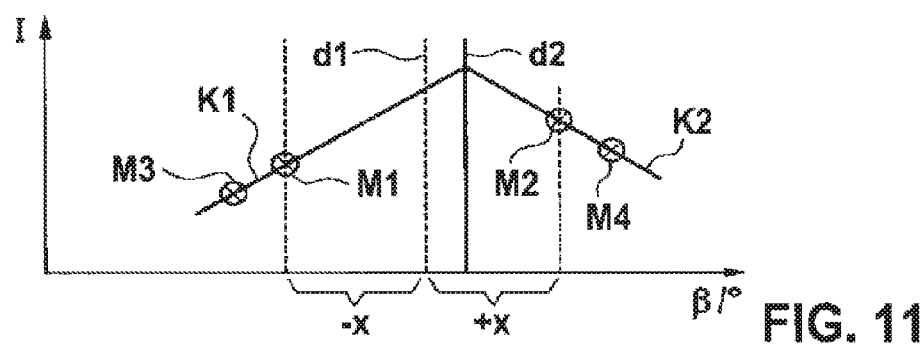
FIG. 11 shows a schematic current/time graph for more accurate determination of the d-axis of a rotor of a synchronous machine according to a further embodiment of the present invention.
Figure 12:
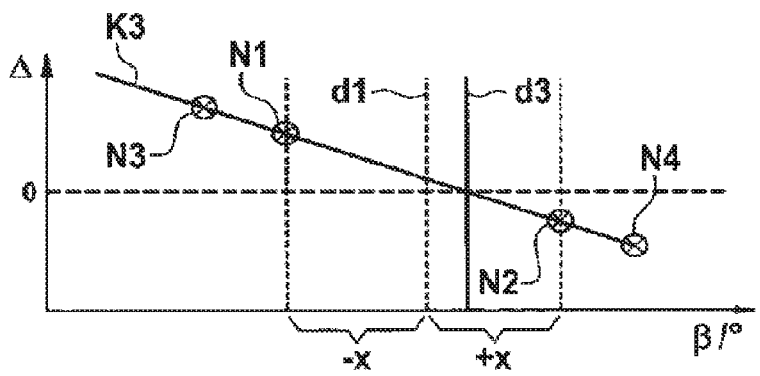
FIG. 12 shows a schematic phase difference graph for more accurate determination of the d-axis of a rotor of a synchronous machine according to a further embodiment of the present invention.

As illustrated by way of example in FIGS. 11 and 12, one or more pairs of refinement voltage pulses can be applied to the synchronous machine and are each distributed symmetrically and the first estimated value d1 for the d-axis. For example, the angular distance x from the first estimated value d1 for the d-axis can be identical in each case for a refinement voltage pulse pair. By way of example, two refinement voltage pulse pairs are shown in each of FIGS. 11 and 12, wherein generally 2n, n>1, pulse pairs are also possible however.

For the response current, refinement current value pairs M1 and M2 and also M3 and M4 are given here. Similarly, refinement phase difference pairs N1 and N2 and also N3 and N4 are given for the phase difference. With the refinement on the basis of the characteristic curve for the current response I, linear regressions are formed on both sides of the estimated d-axis by the refinement voltage values M1 and M3 and M2 and M4 arranged on this side respectively. Two regressions lines K1 and K2, of which the abscissa value of the point of intersection gives a refined estimated value d2 for the d-axis, are thus produced. Similarly, a regression curve of which the abscissa value at an ordinate value of zero gives a further refined estimated value d3 for the d-axis can be produced by all refinement phase differences N1 to N4. Again, a refinement estimated value for the d-axis can be established on the basis, for example, of the estimated values d2 and d3 refined by the current response evaluation and the phase difference evaluation, for example by forming a mean value. A corresponding refinement estimated value for the rotor angle β can therefore be deduced.

Alternatively or additionally to the procedure described in FIGS. 11 to 12, a renewed comparison with the characteristic curves for the current response I and the phase difference Δ can be performed for the refinement current value pairs and refinement phase difference pairs. With amended d.c. link voltage, a new calibration or readjustment of the voltage pulse pairs may also be carried out in some circumstances. In addition, it may be possible, instead of forming linear regression curves from the established refinement current values M1 to M4 and from the established refinement phase differences N1 to N4, to establish estimated curves for the current response value and the phase difference by means of an adjustment computation, for example by means of an estimation via the method of the smallest square.

Furthermore, a curve adaptation of the current response curve and of the phase difference curve can be performed with all detected measured values, and the argument can be equated with both adapted curves with 90° or 180° in order to establish a refinement estimated value for the d-axis.

In the case of salient-pole machines, two saturating voltage pulses can additionally be fed in opposite directions along the established d-axis direction once the rotor angle estimated value has been refined so as to resolve the 180° inaccuracy. For non-salient-pole machines, this is no longer necessary, since two saturation pulses have already been fed in the initial step for exact determination of the position of the rotor.

Once all determination steps have been completed, the voltage intensity of the test voltage pulses can be readjusted for subsequent method repetitions by comparing a target current value of the current responses with the characteristic curves. Here, a factor F can be established for the d.c. link voltage, with which the characteristic curves can be calibrated in order to eliminate the dependence on the fluctuating d.c. link voltage.

Figure 13:
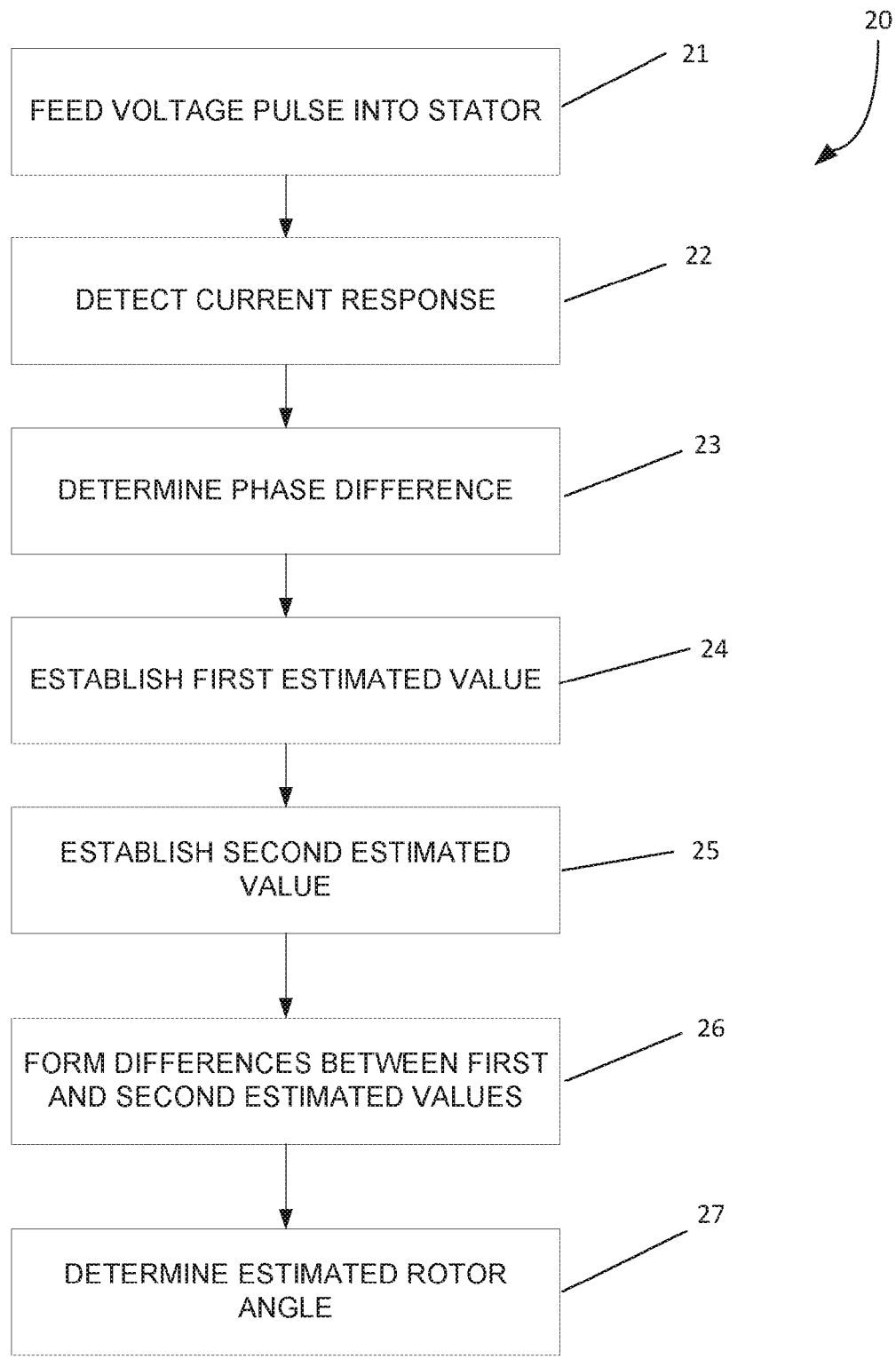
FIG. 13 shows a schematic illustration of a method for estimating the rotor angle of a synchronous machine according to a further embodiment of the present invention.

FIG. 13 shows a schematic illustration of a method 20 for establishing the rotor angle of a synchronous machine, in particular a synchronous machine 101 as illustrated by way of example in FIG. 1. Here, the method 20 can utilize the correlations explained in conjunction with FIGS. 2 to 12. In a first step 21, at least one initial voltage pulse of predefinable pulse length and pulse height is fed into the stator of the synchronous machine. In a second step 22, the respective current response Im to the at least one initial voltage pulse is detected. Then, in step 23, the respective phase difference Δm is determined on the basis of the respective detected current response Im.

In steps 24 and 25, at least one first estimated value β1 and β2 respectively can be established by comparing the current response value Im with a current response characteristic curve I of the synchronous machine on the one hand, and at least one second estimated value β3 and β4 respectively can be estimated by comparing the phase difference Δm with a phase difference characteristic curve Δ of the synchronous machine on the other hand. In a step 26, a multiplicity of differences between each of the first estimated values β1, β2 and each of the second estimated values β3, β4 can be formed on the basis of the estimated values, such that, in a step 27, an initial estimated value for the rotor angle β of the synchronous machine can be determined on the basis of the determined difference having the lowest value.

Should a more accurate estimation of the rotor angle β be necessary, a first estimated value d1 for the d-axis of the synchronous machine can be determined on the basis of the initial estimated value for the rotor angle β. Here, at least one refinement voltage pulse pair of predefinable pulse length and pulse height is fed into the stator of the synchronous machine, wherein the refinement voltage pulse pairs are distanced from the first estimated value d1 for the d-axis of the synchronous machine by the same angular value −x or +x in different directions. The (rotor-)angle-dependent refinement current responses to the refinement voltage pulses can then be detected, on the basis of which the angle-dependent refinement phase differences can then be determined.

For the angle-dependent refinement current responses, first linear regression curves K1 and K2 can be produced on the basis of at least some of the angle-dependent refinement current responses. Similarly, second linear regression curves K3 can be determined on the basis of at least some of the angle-dependent refinement phase differences. These first and/or second linear regression curves can then be used to determine a refined estimated value d2 for the d-axis of the synchronous machine.

Figure 14:
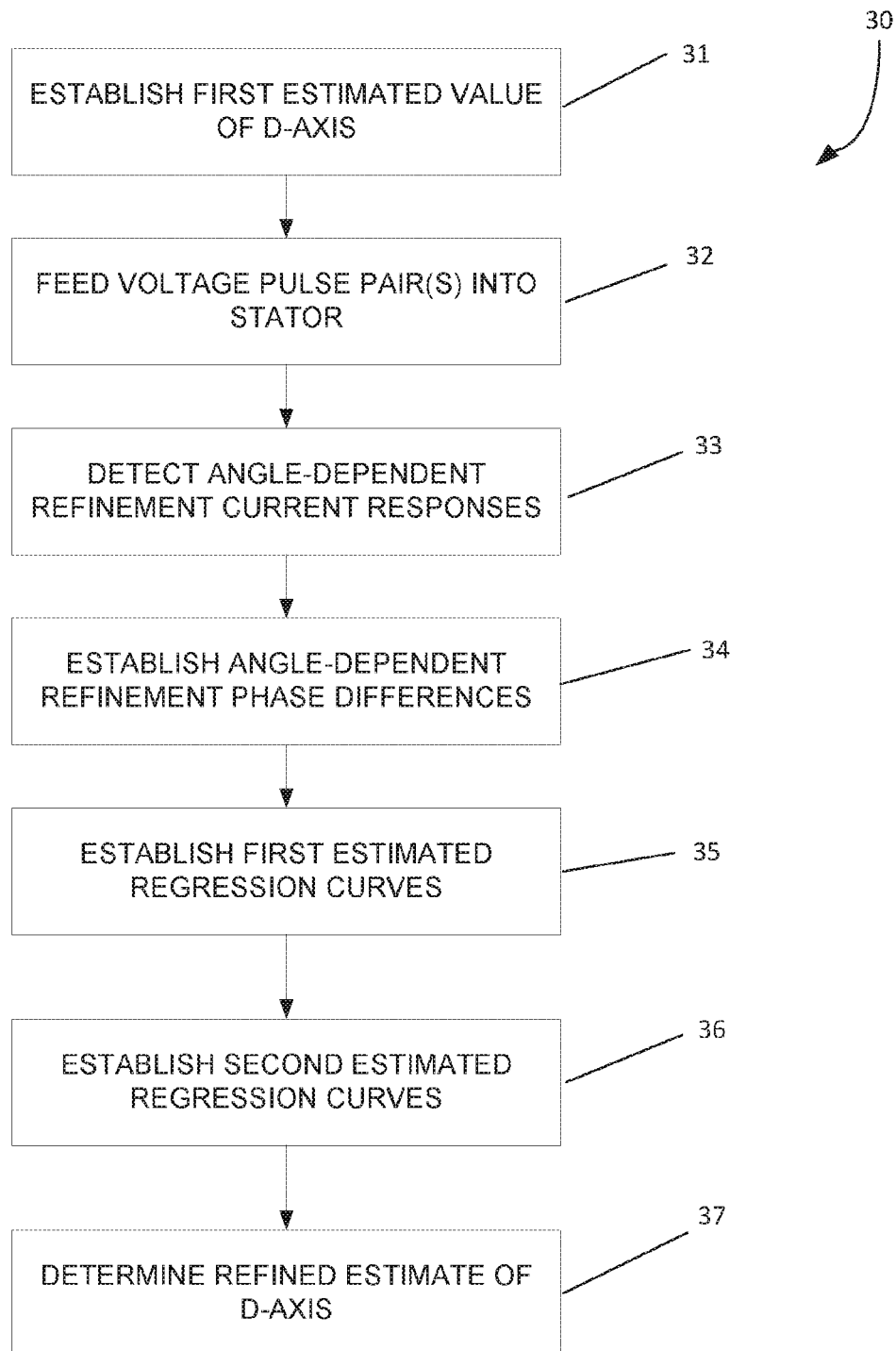
FIG. 14 shows a schematic illustration of a further method for determining the rotor angle of a synchronous machine according to a further embodiment of the present invention.

FIG. 14 shows a schematic illustration of a method 30 for establishing the rotor angle of a synchronous machine, in particular a synchronous machine 101 as illustrated by way of example in FIG. 1. Here, the method 30 can utilize the correlations explained in conjunction with FIGS. 2 to 12. In a first step 31, a first estimated value d1 is determined for the d-axis of the synchronous machine. In a second step 32, at least one refinement voltage pulse pair of predefinable pulse length and pulse height is fed into the stator of the synchronous machine, wherein the refinement voltage pulse pairs are distanced from the first estimated value d1 for the d-axis of the synchronous machine by the same angular value −x or +x in different directions. In a third step 33, the angle-dependent refinement current responses to the refinement voltage pulses are detected.

In a step 34, the (rotor-)angle-dependent refinement phase differences can then be established on the basis of the respective detected refinement current response. These are then used as a basis for steps 35 and 36, in which first estimated or linear regression curves are determined on the basis of at least some of the angle-dependent refinement current responses and second estimated or linear regression curves are determined on the basis of at least some of the angle-dependent refinement phase differences. Lastly, in step 37, a refined estimated value d2 for the d-axis of the synchronous machine can be determined on the basis of the first and/or second estimated or linear regression curves.

Here, the estimated curves can be established by an adjustment computation, for example via an estimation in accordance with the method of the smallest square. By way of example, approximations of the first order, that is to say linear compensating curves, can be used here, as described in conjunction with FIGS. 11 and 12.

The methods 20 and 30 in FIGS. 13 and 14 can be combined suitably such that, after an initial rough estimation of the rotor angle, refinement with the aid of refinement voltage pulses is possible.

The invention claimed is:

1. A method for establishing a rotor angle of a synchronous machine, said method comprising:
    determining an initial estimated value of the rotor angle of the synchronous machine;
    feeding at least one refinement voltage pulse pair, each refinement voltage pulse having a predefined pulse length and pulse height, into the stator of the synchronous machine, wherein the refinement voltage pulse pairs are each fed into the stator at an equal angular distance from the initial estimated value each in different directions from the initial estimated value;
    detecting angle-dependent refinement current responses to the refinement voltage pulses;
    determining angle-dependent refinement phase differences on the basis of the respective detected refinement current responses;
    determining first estimated curves on the basis of at least some of the angle-dependent refinement current responses;
    determining second estimated curves on the basis of at least some of the angle-dependent refinement phase differences; and
    determining a refined estimated value of the rotor angle of the synchronous machine on the basis of the first and the second estimated curves.

2. The method according to claim 1, wherein steps of determining the initial estimated value further comprises:
    feeding at least one initial voltage pulse of predefined pulse length and pulse height into the stator of the synchronous machine;
    detecting the respective current response to the at least one initial voltage pulse;
    determining the respective phase difference between the at least one initial voltage pulse and the respective detected current response;

establishing at least one first estimated value of the rotor angle by comparing the current response with a current response characteristic curve of the synchronous machine;

establishing at least one second estimated value of the rotor angle by comparing the phase difference with a phase difference characteristic curve of the synchronous machine;

forming a multiplicity of differences between each of the first estimated values and each of the second estimated values; and determining the initial estimated value of the rotor angle of the synchronous machine based on a lowest difference of the multiplicity of differences.

3. The method according to claim 2, wherein steps of determining the initial estimated value of the rotor angle of the synchronous machine includes determining a first value of the first estimated values and a second value of the second estimated values that have the lowest difference of the multiplicity of differences;

taking the mean value of the first value and the second values; and determining the initial estimated value of the rotor angle of the synchronous machine based on the mean value.

4. The method according to claim 3, wherein the synchronous machine comprises a non-salient-pole machine, and wherein the at least one initial voltage pulses bring the non-salient-pole machine into saturation.

5. The method according to claim 1, further comprising:

before feeding a refinement voltage pulse pair into the stator, performing a calibration, the calibration including feeding a multiplicity of calibration voltage pulses of predefined pulse length and pulse height into the stator of the synchronous machine;

detecting the angle-dependent calibration current responses to the calibration voltage pulses;

determining the angle-dependent calibration phase differences between each calibration voltage pulse and each detected calibration current response; and determining the current response characteristic curve and the phase difference characteristic curve of the synchronous machine on the basis of the angle-dependent calibration current responses and the angle-dependent calibration phase differences respectively.

6. The method according to claim 5, wherein the calibration voltage pulses are fed into the stator of the synchronous machine in pairs offset in each case by 180°.

7. The method according to claim 1, wherein the first and second estimated curves each comprise linear regression curves.

8. A control device for establishing the rotor angle of a synchronous machine, the control device configured to determine an initial estimated value of the rotor angle of the synchronous machine;

feed at least one refinement voltage pulse pair, each refinement voltage pulse having a predefined pulse length and pulse height, into the stator of the synchronous machine, wherein the refinement voltage pulse pairs are each fed into the stator at an equal angular distance from the initial estimated value each in different directions from the initial estimated value;

detect angle-dependent refinement current responses to the refinement voltage pulses;

determine angle-dependent refinement phase differences on the basis of the respective detected refinement current responses;

determine first estimated curves on the basis of at least some of the angle-dependent refinement current responses;

determine second estimated curves on the basis of at least some of the angle-dependent refinement phase differences; and determine a refined estimated value of the rotor angle of the synchronous machine on the basis of the first and the second estimated curves.

9. An electric drive system, comprising:

a synchronous machine, and a control device configured to determine an initial estimated value of the rotor angle of the synchronous machine;

feed at least one refinement voltage pulse pair, each refinement voltage pulse having a predefined pulse length and pulse height, into the stator of the synchronous machine, wherein the refinement voltage pulse pairs are each fed into the stator at an equal angular distance from the initial estimated value each in different directions from the initial estimated value;

detect angle-dependent refinement current responses to the refinement voltage pulses;

determine angle-dependent refinement phase differences on the basis of the respective detected refinement current responses;

determine first estimated curves on the basis of at least some of the angle-dependent refinement current responses;

determine second estimated curves on the basis of at least some of the angle-dependent refinement phase differences; and determine a refined estimated value of the rotor angle of the synchronous machine on the basis of the first and the second estimated curves;

wherein the control device controls the synchronous machine based on the refined estimated value of the rotor angle.

* * * * *